(12) United States Patent
Kulagin et al.

(10) Patent No.: US 11,126,729 B2
(45) Date of Patent: Sep. 21, 2021

(54) SYSTEM AND METHOD OF ENSURING SECURE CHANGING OF SYSTEM CONFIGURATIONS

(71) Applicant: AO Kaspersky Lab, Moscow (RU)

(72) Inventors: Dmitry A. Kulagin, Moscow (RU); Pavel V. Dyakin, Moscow (RU)

(73) Assignee: AO Kaspersky Lab, Moscow (RU)

(*) Notice: Subject to any disclaimer, the term of this patent is extended or adjusted under 35 U.S.C. 154(b) by 571 days.

(21) Appl. No.: 15/722,009

(22) Filed: Oct. 2, 2017

(65) Prior Publication Data

US 2019/0050577 A1 Feb. 14, 2019

(30) Foreign Application Priority Data

Aug. 10, 2017 (RU) .......................... RU2017128542

(51) Int. Cl.
*G06F 17/00* (2019.01)
*H04L 29/06* (2006.01)
*G06F 21/57* (2013.01)
*G06F 9/445* (2018.01)

(52) U.S. Cl.
CPC ........ *G06F 21/577* (2013.01); *G06F 9/44505* (2013.01); *G06F 21/57* (2013.01); *G06F 2221/034* (2013.01)

(58) Field of Classification Search
CPC .... G06F 21/577; G06F 21/57; G06F 9/44505; G06F 2221/034; G06F 21/50; G06F 2221/2113; G06F 11/3051; H04L 41/0803; H04L 41/0813
See application file for complete search history.

(56) References Cited

U.S. PATENT DOCUMENTS

| | | | |
|---|---|---|---|
| 7,386,885 B1 | 6/2008 | Kaspersky et al. | |
| 8,185,501 B1* | 5/2012 | Cherukumudi | ....... G06F 16/254 |
| | | | 707/647 |
| 8,621,077 B2* | 12/2013 | Hinchliffe | ............... H04L 51/00 |
| | | | 709/225 |

(Continued)

FOREIGN PATENT DOCUMENTS

| | | |
|---|---|---|
| EP | 2290900 A1 | 3/2011 |
| JP | 2008009830 A | 1/2008 |

(Continued)

*Primary Examiner* — Kendall Dolly
*Assistant Examiner* — Kevin Ayala
(74) *Attorney, Agent, or Firm* — Arent Fox LLP; Michael Fainberg

(57) ABSTRACT

A system and method is provided for changing parameter values of a computer system without changing security properties. An exemplary method includes receiving a request to change a system configuration of the computer system and identifying a parameter relating to system configurations based on the received request. Furthermore, based on the identified parameter, the method includes receiving instructions to change the identified at least one parameter and initiating a transaction to change the identified at least one parameter based on the received instructions. The initiated transaction is then analyzed to determine whether the change to the parameter will lower a security level of the computer system. If not, the method will execute the change of the identified parameter related to the system configuration.

21 Claims, 5 Drawing Sheets

(56)  References Cited

U.S. PATENT DOCUMENTS

| | | | |
|---|---|---|---|
| 9,237,180 B2 | 1/2016 | McKay | |
| 10,275,282 B1* | 4/2019 | Brandwine | G06F 8/65 |
| 10,642,784 B2* | 5/2020 | Hasegawa | G06F 11/1451 |
| 2002/0188778 A1* | 12/2002 | Iwanojko | G06F 9/44505 |
| | | | 710/104 |
| 2003/0055529 A1* | 3/2003 | Aosawa | H04L 41/0883 |
| | | | 700/220 |
| 2004/0059920 A1 | 3/2004 | Godwin | |
| 2005/0034117 A1* | 2/2005 | Emaru | G06F 8/61 |
| | | | 717/174 |
| 2007/0061125 A1* | 3/2007 | Bhatt | G06F 21/577 |
| | | | 703/20 |
| 2010/0319050 A1 | 12/2010 | Russeli et al. | |
| 2013/0019140 A1 | 1/2013 | Rogers et al. | |
| 2014/0096122 A1 | 4/2014 | Blumfield et al. | |
| 2014/0280268 A1* | 9/2014 | McKay | H04L 67/34 |
| | | | 707/758 |
| 2015/0249766 A1 | 9/2015 | Asahara | |
| 2016/0162269 A1* | 6/2016 | Pogorelik | G06F 21/57 |
| | | | 726/25 |
| 2018/0074828 A1* | 3/2018 | Xiao | G06F 9/44505 |

FOREIGN PATENT DOCUMENTS

| | | |
|---|---|---|
| JP | 2008065409 A | 3/2008 |
| JP | 2008234249 A | 10/2008 |
| JP | 2011197864 A | 10/2011 |
| WO | 2005/029294 A1 | 3/2005 |

* cited by examiner

SYSTEM AND METHOD OF ENSURING SECURE CHANGING OF SYSTEM CONFIGURATIONS

CROSS-REFERENCE TO RELATED APPLICATIONS

This application claims the benefit of priority under 35 U.S.C. 119(a)-(d) to a Russian Application No. 2017128542 filed on Aug. 10, 2017, which is incorporated by reference herein in its entirety.

FIELD OF TECHNOLOGY

The present disclosure relates to the field of security in computer systems, and more particularly, to a system and method of changing the values of the parameters of a computer system without changing the security properties.

BACKGROUND

The use and the accompanying evolution of security systems in computer devices continues to grow at a significant pace. Currently, there already exist an enormous number of security systems, ranging from simple to highly complex security systems. Simple systems as a rule are aimed at protecting against a single threat (i.e., security problem) and contain a functionality directed at solving the corresponding problem. Complex systems may be entire comprehensive solutions for ensuring comprehensive protection of a computer device, ranging from protection against malicious software to control of the computer device and its components.

Therefore, many companies are working on creating and developing various technologies relating to the improvement of security systems. The technologies may involve both the immediate creation of solutions to ensure the safety and resources of devices or data of users against various threats and the improvement of such aspects of a security system as performance, fault resistance, and ergonomics, both of the security system itself and the systems in which the security system is operating.

For example, U.S. Pat. No. 7,386,885 B1 proposes a security system for controlling the interaction between program components of a computer system. This conventional security system works on the principle of separating the program execution environment from the implementation of the security policy. Moreover, the control of the security of interaction of the components is based on a dynamically formulated set of attributes describing the characteristics of the interaction, and a set of rules describing the security policy. The security system utilizes limitations and attributes indicated in various life stages of each program component, where limitations are gradually added in each successive life stage.

The more the security system take account of different aspects and criteria, the more complicated it becomes to control, which means that the users will need additional skills when working with it afterwards, such as skills of a system administrator, or more specialized skills of management with a specific security system. Therefore, when creating a mechanism of interaction with a particular security system, the level of knowledge of the users is taken into account and the security system will be designed accordingly. In other words, the system developers take into account the need for the user to have specialized knowledge when working with, setting up, or overseeing the security system, as well as the depth of such knowledge.

Thus, certain designs of security systems intended for devices (such as servers and computers of network administrators) in which comprehensive security, control, setup and subsequent regulating are required are usually complicated and demand an array of special knowledge for their setup and regulation. At the same time, in designs of security systems which are intended for consumer devices and systems, these are generally created to be more interactive and allow a less trained user to perform the setup of the security system. Such systems are either limited to a general setup of the system, i.e., they lack a "fine tuning" of all the parameters of the security system, or they do not have access to the setup of critically important properties of both the security system itself and the operating system controlled by the security system. Therefore, one of the problems in such existing security systems is the creation of such a solution that combines complex security systems with simple control. For example, it is possible for a user without special knowledge to control and change the setup parameters of complex security systems while preventing mistakes when changing the security attributes that may result in a security breach of both the security system itself and the system which it is controlling, such as the operating system.

Yet another technical problem for the control of security is affording a possibility of making changes to parameters that influence the level of security of systems without a security breach of the systems. Thus, the setting of untrue or mutually inconsistent values of the parameters in a particular system may result in a breach in the security properties in the absence of a proper oversight during such a reconfiguration of the system. Thus, in view of the limitations of such existing systems, new approaches are needed for the solving of the aforementioned technical problems.

SUMMARY

The present disclosure overcomes the limitations described above and provides a system and method that enables the making of a series of changes at one time and verifying the correctness of the necessary number of changes in parameters at any moment of time, for example, during the working of certain applications to improve their performance or in the event of their greater importance as compared to other applications.

The disclosed system and method has been achieved with consideration of the above-described problems of existing systems and the objective to enable a safe changing of the configuration (parameters) of systems, for example, operating systems. In other words, in the case of making changes to the parameters of a system being monitored, the disclosed system and method provides control over the changes being made by determining the influence of such changes in parameters on the possible change in security of the system being monitored from the standpoint of a breach in the security properties and reveals possible changes in parameters that are dependent on the parameters being changed, also with the goal of no security breach.

Accordingly, the disclosed system and method provides the technical advantage of providing a given level of security of a system in the event of changing its configuration, specifically the parameters of the system, by verifying the consistency of the parameters being changed and the dependent parameters and their joint influence on the security properties of the system, with a decision then being made. Another technical advantage of the present system and method is to provide fault tolerance of the system to changes being made in the system configuration by verifying the consistency of the parameters being changed with all the parameters of the configuration and taking steps to ensure an efficient working of the system in the event that a conflict of parameters is found. Yet another technical advantage of the system and method is the improvement of the working stability of the system (such as the operating system) by the ability to determine and correct changes being made to parameters influencing lack of stability and system failures.

Thus, an exemplary method is provided for changing parameter values of a computer system without changing security properties. In this aspect, the method includes receiving, by a processor, a request to change a system configuration of the computer system; identifying, based on the request to change the system configuration, at least one parameter in a database of parameters relating to system configurations of the computer system; receiving, by the processor, instructions to change the identified at least one parameter; initiating, by the processor, a transaction to change the identified at least one parameter based on the received instructions; determining, by the processor, whether the initiated transaction to change the identified at least one parameter will lower at least one security level of the computer system; and executing, by the processor, the change of the identified at least one parameter related to the system configuration when the processor determines that the initiated transaction will not lower the at least one security level of the computer system.

In another aspect, the method includes identifying, based on the request to change the system configuration, at least one key, such that the identifying of the at least one parameter in the database of parameters is based on the identified key.

In another aspect, the method includes displaying on a transaction window an interface configured to receive from an operator of the computer system the instructions to change the identified at least one parameter.

In another aspect of the method, the instructions comprise at least one of a request to modify a value of the identified at least one parameter, a removal of the identified at least one parameter, or an adding of a new parameter related to the identified at least one parameter.

In another aspect, the method includes determining, by the processor, a current state of the identified at least one parameter; and analyzing the initiated transaction based on the determined current state of the identified at least one parameter and the at least one security level of the computer system to determine whether changes to the identified at least one parameter from the determined current state will conform to rules of the at least one security level of the computer system.

In another aspect, the method includes canceling the change of the identified at least one parameter when the changes to the identified at least one parameter will not conform to the rules of the at least one security level of the computer system.

In another aspect, the method includes identifying, by the processor, at least one variation to the instructions to change the identified at least one parameter when the processor determines that the initiated transaction to change the identified at least one parameter will lower the at least one security level of the computer system; and determining, by the processor, whether the identified at least one variation to the instructions to change the identified at least one parameter will lower the at least one security level of the computer system if the identified at least one variation is executed by the processor to change the system configurations of the computer system.

In another aspect, the method includes presenting, on a user interface, the identified at least one variation to the instructions to change the identified at least one parameter; and executing, by the processor, the identified at least one variation to change the system configurations of the computer system upon receiving confirmation from a user instruction via the user interface.

In another aspect, the method includes performing a preliminary analysis of the received instructions to change the identified at least one parameter before the initiating of the transaction to change the identified at least one parameter to verify consistency between the identified at least one parameter and at least one unchanged parameter in the in the database of parameters that is related to the identified at least one parameter.

In another aspect of the method, the initiating of the transaction to change the identified at least one parameter is performed upon verifying the consistency between the at least one unchanged parameter and the identified at least one parameter.

According to yet another aspect, a system is provided for changing parameter values of a computer system without changing security properties. In this aspect, the system includes a database of parameters relating to system configurations of the computer system; and a processor configured to: receive a request to change a system configuration of the computer system; identify, based on the request to change the system configuration, at least one parameter in the database of parameters relating to the system configurations of the computer system; receive instructions to change the identified at least one parameter; initiate a transaction to change the identified at least one parameter based on the received instructions; determine whether the initiated transaction to change the identified at least one parameter will lower at least one security level of the computer system; and execute the change of the identified at least one parameter related to the system configuration when the processor determines that the initiated transaction will not lower the at least one security level of the computer system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
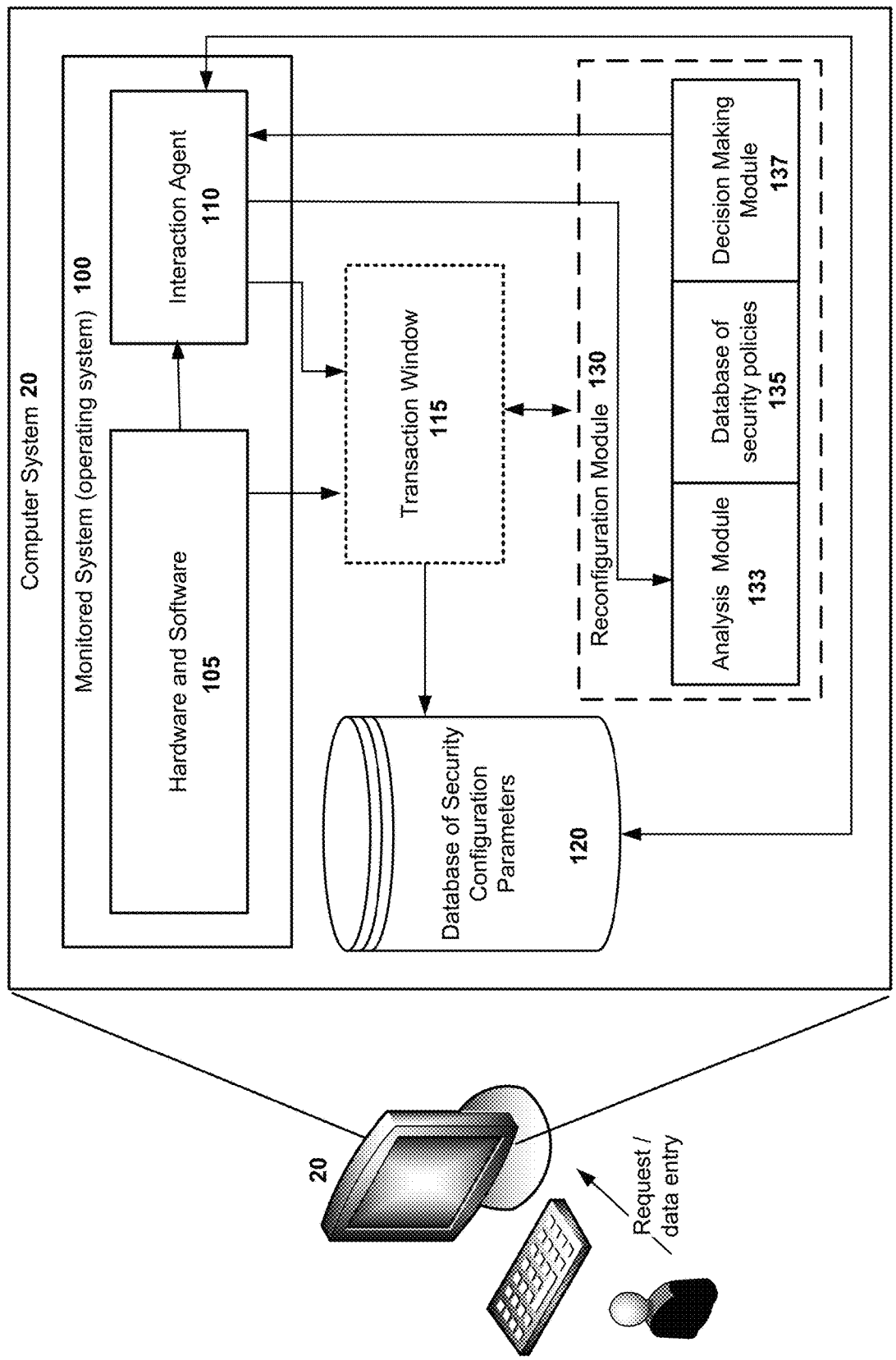
FIG. 1 illustrates a block diagram of a system for ensuring safe changing of the configuration of computer system according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

The disclosed system and method ensures an established level of security of a system upon reconfiguration of that system, specifically, when making changes to parameters of the system configuration. An example of such a system is the block diagram of the system 100 shown in FIG. 1. By the configuration of a system (computer system) is meant the set of parameters, both hardware and software (such as applications, switches, values of variables, control sequences) specifying the operating conditions of the system. The changes are made by initiators, being either the users of the system or the device on which the system is running, or an external system (any other system) with respect to that system. The disclosed system and method ensures a given level of security is a monitored system (the system 100). Examples of a monitored system are both computing devices (such as a computer with its computer system) and software.

The term software can be considered system software, such as operating systems, and application programs, such as security systems, learning programs, accounting programs, CAD, and so forth, or applications when implemented in mobile devices such as smartphones. The external system may either be contained in the monitored system or be outside the bounds of the monitored system, yet have influence on the monitored system. For example, the influence is manifested in the form of a utilization of the resources of the monitored system or changes made to the configuration parameters of the monitored system. Furthermore, the external system and the monitored system may be implemented either in the same hardware (such as a personal computer or server) or different hardware.

The implementation of the disclosed system and method involves the creating of a secure storage of configuration parameters of the monitored system and performing a secure reconfiguration. The chief feature of such an implementation is the separating of the security policy from the business logic policy of the systems (the monitored system and external systems). This makes it possible to create a certain common dynamic storage, i.e., a storage of configuration parameters, and to separately formulate, and then also determine or designate security policies which need to be placed on different variants of use of this storage, where the variants of use are at least: 1) assigning a policy to each parameter individually, 2) assigning a policy for updating the configuration as a whole. This process enables a flexible regulation of the changes being made with the help of the dynamic rules contained in the policies.

In order to provide a secure storage, access to it for modification of the configuration occurs through an Interaction Agent (such as the Interaction Agent 110), during which all changes being made to the storage are analyzed by a secure reconfiguration module (hereinafter, the reconfiguration module). Such an implementation makes it possible to separate the function for control of the configuration parameters of the monitored system from the system itself and from external systems. The storage contains at least the parameters which influence the level of security of the monitored system (software).

In the following, when describing a sample aspect of the exemplary system as shown in FIG. 1, three entities are involved in the exemplary aspect: the monitored system 100, the reconfiguration module 130 and the storage of configuration parameters of the monitored system (hereinafter, the parameters storage) 120. Likewise, there is presented below an exemplary aspect of the method for providing a given level of security when changing the configuration of the monitored system by identifying erroneous changes and verifying the consistency of the values of the parameters changed with the values of the other parameters. The level of security characterizes the totality of the conditions and criteria of the interaction of the elements (hardware and software) and their parameters of the monitored system with each other and with the elements of external systems so that the monitored system is provided protection in regard to various threats and/or the working efficiency of the system. The security level can be regulated, for example, from a starting level (when general rules of protection against threats are needed) to a maximum level (when a policy is provided for strict limitations on access to critical system elements, such as the hard disk drive (HDD), the processor, the data transmission tool, and so forth).

It should be noted that, depending on the aspect of the disclosed system and method, the interaction with the user or with the external system (for example, any given application may be an external system for the operating system) when changing the configuration parameters of the monitored system may be carried out both individually and as a whole. Thus, if the initiator (such as a user) wishes to modify the values of the configuration parameters of the monitored system, the initiator will make a request to the Interaction Agent 110, and the request may contain at least data regarding the parameters which need to be changed. After this, the Interaction Agent 110 provides a transaction interface (forms a transaction window 115) for the subsequent making of the changes to the values of the parameters or new parameters. The transaction interface is an interface which provides a functionality for performing a transaction with the aid of a transaction window in which the parameters are presented and changed. Depending on the exemplary aspect, the interface may contain either a current copy of the state of all parameters or only those parameters which are accessible to the user for changing. According to an exemplary aspect, the accessibility of the parameters may be analyzed in advance on the basis of the role or the account record under which the user is working in the system. Likewise, the forming of the transaction window is done by an interaction between the Interaction Agent 110 and the parameters storage 120 in order to obtain information on the parameters which may be modified by the corresponding external system or the user. Moreover, the most preferable method of implementation is when the Interaction Agent 110 receives requests from the user for changes to parameters through software containing the parameters which can be regulated or controlling the changes to the parameters. In this case, the interaction will occur as with an external system. The external system sends a request to the Interaction Agent 110 for changes to parameters. Reasons for external systems independently adding changes to parameters might be, for example, the running or initialization of the external system in the monitored system, during which additional dynamic parameters for the monitored system are formed or appear. The reconfiguration module 130 in turn, on the basis of the request received for changes by the transaction mechanism, will make the changes to the storage through the Interaction Agent 110, first checking the changes for correctness and consistency. Thus, in its general form, the system for providing a secure changing of the configuration of the system 100, as represented in FIG. 1, includes the parameters storage 120 and the reconfiguration module 130. In one variant aspect, the monitored system 100 is an operating system, for example, one of the operating systems of the Microsoft Windows, Mac OS, Kaspersky OS, or the Android OS families. Therefore, the exemplary aspects presented below are examples of configuration parameters which are characteristic of the operating systems.

The parameters storage 120 contains at least all dynamic configuration parameters of the system 100, which may pertain to both hardware and software of the system 100. Dynamic parameters are parameters which may be changed in the course of the operation of the system 100. Since, when changing parameters, it is not always possible to know at once (before making the changes) how they or parameters related to them will affect the working of the system 100, an incorrect changing of such parameters may entail a change in the security properties of the system 100 and, accordingly, a possible lowering of the given level of security. It is therefore necessary to monitor the parameters from the standpoint of the correctness of the changes being made and to verify the consistency with related or dependent parameters, in which case the relationship between parameters from the storage might not even be known. Such parameters may be either parameters of the system 100 itself or parameters of external systems.

In one variant aspect of the parameters storage 120, the parameters contained therein are identified by keys and their corresponding types of parameters, such as signed and unsigned whole numbers, strings, and floating decimal numbers. The term "key" generally refers to an identifier which enables an exact identification of the corresponding parameter in the parameters storage 120 and depending on the exemplary aspect of disclosed system and method, it may have various forms. Each parameter is associated with the concept of a "security label". A security label is a group (list) of attributes describing the possibility of access and use of the parameter by users or other systems. As a rule, each user in the system corresponds to at least one of the following concepts (identifiers): user account record and/or user role in the corresponding system, which will also be utilized in the security label. Thus, in different exemplary aspects, the security label is used to realize different methods of monitoring of the parameters contained in the parameters storage 120, and of the storage 120 as a whole.

Moreover, the parameters storage 120 supports the transactional nature of a updating, i.e., changes to parameters are not made one by one, but instead a list of changes is made for parameters needing to be changed at a given moment of time. In other words, for the making of changes in the parameters storage 120 a transactional window 115 of the transactional interface is used, which the user uses through software or an external system 105 to make the necessary changes to the values of the parameters represented in that transactional window. The creation of the transactional window 115 and the subsequent forming of the transaction containing the changes made, with its committing, is done by the Interaction Agent 110, which then sends the transaction to the reconfiguration module 130 for verification.

The reconfiguration module 130 in turn ensures a secure making of changes to the parameters contained in the parameters storage 120 by verifying the correctness of the changes made and contained in the committed transaction by security policies (i.e., conformity with requirements satisfying no decrease in the given level of security) and the consistency with other parameters and values of parameters in the storage 120. By a change in parameters is considered to mean both a change in the values of parameters already contained in the storage and the placing of new parameters in the storage. The reconfiguration module 130 includes an analysis module 133, a database of security policies 135 and a decision making module 137, and it interacts with the Interaction Agent 110. It should be noted that, depending on the exemplary aspect of the disclosed system and method, the Interaction Agent 110 may be part of the monitored system 100, or it may be combined with the reconfiguration module 130.

The Interaction Agent 110 is responsible for the interaction between the initiator (the user or an external system), the storage 120 and the reconfiguration module 130, during which the Interaction Agent 110 initiates (creates) the transaction for changing the configuration of the system 100 and forms a current copy of the state of the parameters in the storage 120. In one sample aspect, the Interaction Agent 110 may be a database management system (DBMS), at least in that portion where the interaction with the parameters storage 120 occurs for making changes to the parameters. In the context of the interaction between, for example, software 105 and the transaction interface, new values are assigned to parameters, after which the Interaction Agent 110 commits the transaction and sends it for verification to the reconfiguration system 130, specifically, to the analysis module 133. Along with the transaction, the Interaction Agent 110 also sends the current copy of the state of the parameters in the parameters storage 120 which is formed at the moment of making the changes. The current copy is created by a snapshot technique, for example, which makes it possible to depict the static state of a set (or all) of parameters of the storage. Thus, the current copy constitutes a certain data set of a determined kind.

The analysis module 133 is responsible for evaluating the changes made in the transaction on the basis of the current copy of the state of the parameters with the help of the security policies from the database of security policies 135. The database of security policies 135 contains specified security policies for the parameters of the storage 120. Thus, the security policies make it possible to verify how a change in the values of the parameters contained in the transaction, or other parameters related to them from the storage 120, will influence the given level of security of the system 100. Furthermore, each security policy is formed in dependence on the need for a joint checking of the parameters, i.e., the policy may check either one parameter or several of them (the only limitations are technical or software ones). The distinguishing feature of the use of such security policies is that the security policies in the checking of the changes do not perform a direct action with the storage 120 or the parameters contained in it, but instead the entire analysis, including the check for allowable changes to parameters and their influence on other parameters, is done during the evaluation by using the current copy of the state of the parameters at the time of making the changes.

Consequently, the evaluation is done by applying the security policies to the parameters from the transaction and the indicated current copy containing information on the state of the parameters in the storage 120, checking both the influence of the change of each parameter separately from the other parameters on the system 100 and the influence of change on the other parameters, from the standpoint of the consistency of the changed parameters and the parameters related to them. Thus, a check is made for the fulfillment and/or compliance with all the conditions contained in the security policies that are responsible for checking the changed parameters contained in the transaction and the parameters related to them from the indicated current copy. The result of the evaluation is a determination of the influence of the changes made at least on: the appearance of collisions with related or dependent parameters in the storage 120, and/or a security breach of the system 100 itself.

In particular, in exemplary aspects of the disclosed system and method, the evaluating of the influence of the changes in parameters on the security level of the monitored system 100 is likewise realized by one of the known methods of evaluation and depends on the complexity (the number of parameters and the types of relation between them) of the monitored system and the requirements on the accuracy of the evaluation (i.e., the probability of appearance of errors of the first and second kind). Thus, for example, the evaluation method is one of the following types of analysis: binary, probabilistic, correlational and vectorial.

After performing the analysis, the analysis module 133 presents the results of the analysis to the decision making module 137. The results contain information on possible violation of the security level and/or identified collisions, in the event of inconsistency of related parameters.

In yet another variant aspect of the disclosed system and method, before the Interaction Agent 110 commits the transaction with the changes made, a preliminary verification of the changes made will be performed. For this, the Interaction Agent 110 sends a request to the analysis module 133, where the request will be formatted in a preferable form for analysis and will contain at least the following data: the identifier of the application; the key presented by the application; and the changed values of the parameters. The analysis module 133 will apply the security policies from the database of security policies 135 to the corresponding parameters and their changes. In accordance with the policies applied, the possibility of making such changes to the parameters will be verified from the standpoint of their correctness, i.e., whether the new value falls within the allowable range, whether it does not go beyond an established threshold value, or whether it conforms to specified values. Thus, for example, if one of the rules says that the parameters which specify IP addresses in a network must correspond only for a specific (given) subnet mask, a check will be made to verify whether the IP address in the changed parameter belongs to the same subnet as the others. During the preliminary verification, the rules or conditions from the applied security policies might not be fulfilled entirely, and in this case the unfilled portion of those policies will be checked afterwards by the analysis module 133.

In another variant aspect, the Interaction Agent 110 during the forming of the transaction (transaction window) will form it such as to first consider the portion of the requirements from the security policies in which changes have been made to the values of the parameters of the storage. For example, a transactional window 115 will be formed for a user in accordance with his account record which will contain only those parameters and only in those ranges which can be changed for the corresponding account record. It will then only be necessary for the analysis module 133 to check the consistency with related parameters.

The decision making module 137 makes a decision on the changes made to the parameters contained in the storage 120 on the basis of an analysis of the results of the evaluation obtained from the analysis module 133. The decision made indicates one of three possible decisions: (1) make the changes to the parameters in the form as specified in the transactional window, since the security level is not lowered; (2) make the changes to the parameters, but only with preliminary correction to satisfy the specified security level, wherein the correction may affect both the changes specified in the transactional window and the parameters related to the parameters being changed; or (3) it is not possible to make the corresponding change, since the security level will be lowered.

If it is necessary to perform a correction, the most preferable correction will be determined. Depending on the exemplary aspect, a list of conditions will be determined and used to determine the correction of the changes. In variant exemplary aspects, the list also contains information on the priority of the conditions and the need to satisfy one condition or another upon analysis of the possible correction of the changes made. For example, the list of conditions might contain the following conditions:

the changes will not be made if any correction of the parameters being changed or related parameters will result in a lower security level;

the changes being made to the parameters in the transactional window have priority over possible changes in related parameters so long as the security level is not changed, i.e., the correction of dependent parameters is done first of all;

when correcting the related parameters, inform the user about the correction if the user himself made the changes; and/or before correcting the parameters being changed, ask for the consent of the user.

After making the corresponding decision by the module 137, the reconfiguration module 130 updates the parameters in the storage 120 by making the corresponding changes through the Interaction Agent 110 and specifically all the changes, the corrected changes or the parts of changes which conform to the given level of security.

Yet another important item in the implementation of the disclosed system and method is the possibility of supporting the predetermination (predictability of behavior) of the monitored system at the time of booting. Suppose there is a security policy which checks the connection being made for a corresponding port, then the policy indicates that the given port should be in a certain range, and what that range is will then be determined from a certain parameter contained in the storage 120. Accordingly, when the monitored system is initialized (started), as early as possible during the booting the reconfiguration module 130 should be started. Obviously, this will occur before the loading of the storage 120.

Therefore, in order for the behavior to be predetermined, all the security policies and other consumers of the monitored system 100 (such as external systems) which use in their configuration parameters contained in the parameters storage 120 will have a special value, such as a boot value. This value will be specified in advance and used from the moment of booting to the time when the parameters storage 120 is ready to work. After this, a check is made of the parameters with the boot value for their conformity with the values in the parameters storage 120. Such an approach makes it possible to analyze the state of the monitored system 100 at the moment of its booting, and also at any moment of time, and to correct it if it does not conform to the security level.

The follow provides an example of the working of the system for ensuring a secure change of configuration. For example, it is assumed that a software 105 has been launched in the system 100, being an application, and as a consequence it becomes necessary to perform a change in the parameters. The application 105 accesses the Interaction Agent 110, in which a key is indicated for the making of the changes. In response, the Interaction Agent 110 creates a transactional window 115 to enter the necessary changes to the parameters. In forming the transactional window 115 the Interaction Agent 110 on the basis of the key received and the identifier of the application will determine the parameters corresponding to the application, in the parameters storage 120, and check the security label of these parameters for its conformity. Next, the Interaction Agent 110 displays in the transaction window 115 only those parameters which correspond to the application 105. The application 105 specifies the necessary changes in the parameters presented in the transaction window 115 of the transactional interface. Then the Interaction Agent 110 commits the transaction and forms a current copy (snapshot) of the parameters of the storage 120, which it then dispatches to the reconfiguration module 130, specifically, to the analysis module 133.

The reconfiguration module 130 with the help of the analysis module 133 performs an analysis of the received data according to the security policies, by checking the consistency of the parameters from the storage when the changes are applied. In particular, it checks how parameters related to the parameters whose values have been changed by the application will conform to the security policies and whether it is necessary to change them in order to maintain the security level. The reconfiguration module 130 then makes the following decision with the aid of the module 137. If the changes being made conform to all necessary security policies upon performing the check and consequently the security level is not worsened, the reconfiguration module 130 makes a decision to update the configuration of the parameters storage 120 in accordance with the changes made and without any kind of correction, informing the Interaction Agent 110 of this, which in turn performs the updating of the parameters storage 120. If even one security policy is not complied with, a search is made for a possible correction of the changes being made or dependent parameters according to a specified list of conditions (as mentioned above). The search for correction variants is performed in a way so that the security level is not worsened. After determining possible correction variants, the reconfiguration module 130 informs the Interaction Agent 110 about this, which then makes the corresponding correction and updates the configuration in the storage 120.

In another example of the working of the system for providing a secure changing of configuration, if the change is made initially by the user, the Interaction Agent 110 informs the user as to a possible correction and waits for an answer from the user. After receiving the corresponding answer (with a chosen correction variant), the Interaction Agent 110 performs the corresponding update in the storage 120.

In the event that the system 130 does not find a single correction variant that does not lower the given security level, the system 130 informs the Interaction Agent 110 as to the lowering of the security level and a possible failure (threat) in the working of the monitored system 100. The Interaction Agent 110 in turn when interacting with an application will cancel the changes made, and in the event of interacting with the user it will inform him as to such consequences. It should be noted that the final actions of the Interaction Agent 110 after making a particular decision by the reconfiguration system 130 may be fully automated and not contain any requests sent to the user.

Figure 2:
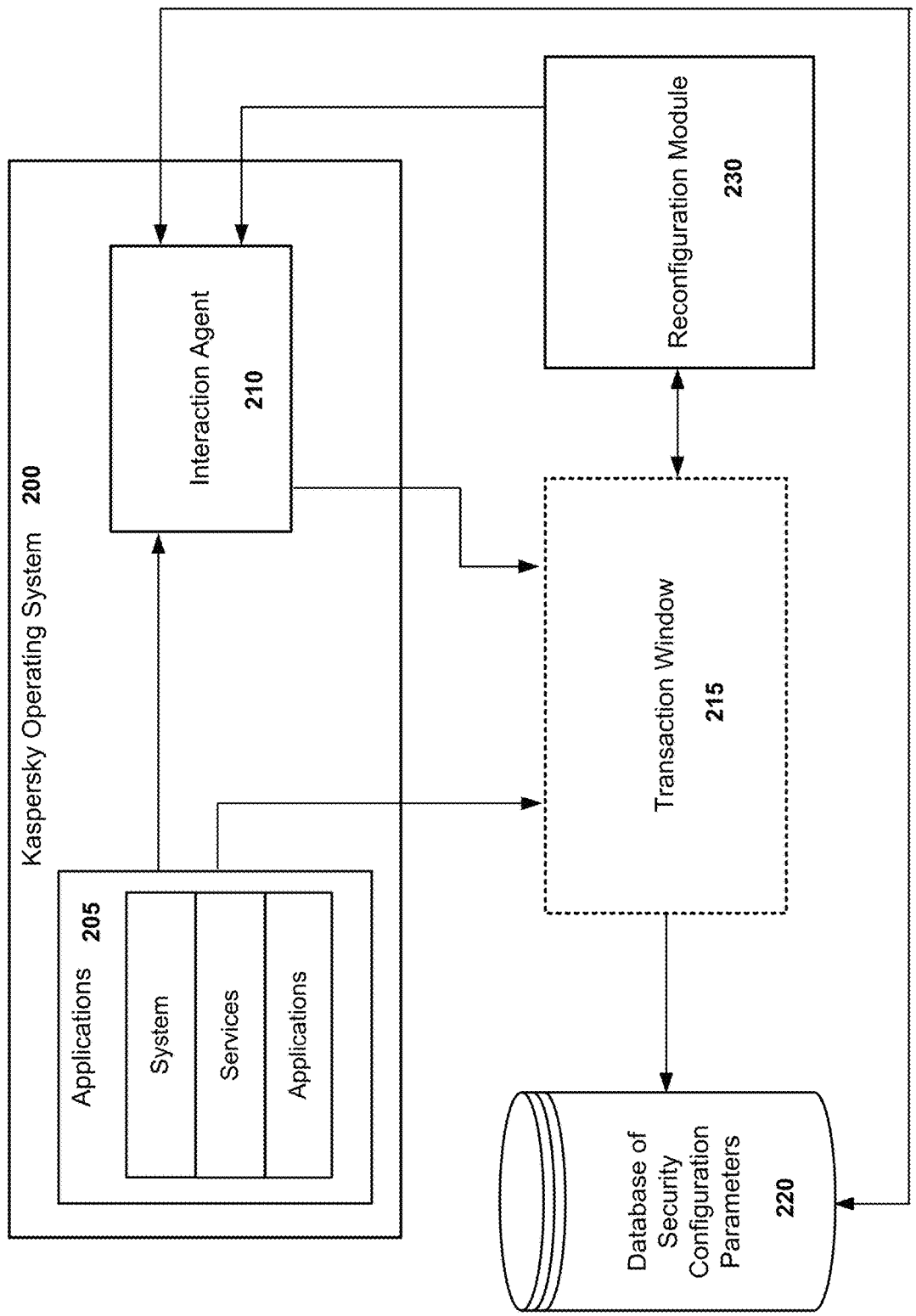
FIG. 2 illustrates a block diagram of the exemplary system according to an exemplary aspect.

Yet another example of the implementing of the system for providing a secure changing of configuration of the monitored system is the example shown in FIG. 2. In the presented example, a secure storage of the configuration parameters 220 is realized (the same as the storage 120) for the operating system Kaspersky OS 200 (a particular instance of the system 100) and the reconfiguration module 230 is analogous to the reconfiguration module 130. In this case, it is necessary to solve the problem of assigning processor time quotas to various applications 205. In the context of the given problem, changes are made periodically in the parameters of use of processor time by the applications 205.

For example, it is assumed that the Kaspersky OS (hereinafter, KOS) 200 contains three groups of applications: "system", "services" and "applications". Each group contains at least one application 205. It is also assumed that the group "applications" contains the following three applications: Voice_Recognition, Face_Recognition and Remote_Connectivity. The storage 220 contains the parameters for use of processor time by each of these applications, i.e., the value of the parameter shows the quota of use of processor time by the corresponding application. For the exemplary aspect, it is assumed that the following pairs of key/value are contained for these applications 205 in the storage 220:

| application | key/value |
| --- | --- |
| Voice_Recognition | cpu.limits.VoiceRecognition: 10 |
| Face_Recognition | cpu.limits.FaceRecognition: 30 |
| Remote_Connectivity | cpu.limits.RemoteConnectivity: 5 |

Thus, on the basis of the key, a corresponding parameter in the storage 220 is accessed, and the indicated value corresponds to the processor time in percentage (out of 100%) which can be used by the corresponding application 205. Accordingly, the storage allows a changing of these parameters during the working of the KOS 200.

Thus, when the indicated parameters are changed, the reconfiguration module 230 applies the corresponding security policies to the changes in values of the parameters. For example, at least the following security policy is applied, containing two rules: (1) An application from the group "applications" cannot use more than 33% of the processor time of the CPU; and (2) The entire group "applications" cannot use more than 80% of the processor time of the CPU.

Thus, the working of the presented system in the case of making changes will be as follows. In response to receiving a request to change the parameters of use of processor time from at least one of the indicated applications, the Agent (like the Interaction Agent 110) 210 initiates a transaction window 215 for changing the configuration of the application. In the exemplary aspect, the transaction window contains only those parameters which the application can change, for example. For this, the Agent 210 on the basis of information about the application will select the corresponding parameters from the storage 220. In the course of the transaction, the application assigns new values to the parameter, after which the Agent 210 commits the transaction and forms a current copy of the configuration of the storage 220.

Moreover, in another exemplary aspect, during the formation of the transaction the Agent 210 requests a preliminary verification from the reconfiguration system 230. The system 230 will perform the preliminary evaluation by applying the above-indicated security policy, for example, only the rule which states that no application from the group "applications" has assigned values of the parameter of use of the processor greater than 33% of the CPU. After this, the system 230 will send information about the evaluation to the Agent 210 in reply to its query. Consequently, the Agent 210 will make the necessary changes.

Hence, the Agent 210 has committed the transaction with the changes made and has sent it for verification to the reconfiguration module 230. The reconfiguration module 230 will perform the check for correctness of the changes in the parameters, including whether it is consistent with other changed parameters according to the security policy. For this, the reconfiguration module 230 on the basis of the received current copy of the configuration of the storage 220 applies rules from the security policy. If a preliminary verification has been performed, only the rule will be applied hereafter which adds up the quotas of all applications from the "applications" group and verifies that they do not exceed 80% of the CPU. After which a decision is made to update the parameters in the configuration of the storage.

Thus, for example, in the event that a changing of the quotas for the applications is done in the proportion: 30%, 30%, 10%, the reconfiguration module 230 will make a decision for correctness and consistency of the changes made. The Agent 210 in turn, after receiving such a decision, will perform the updating of the parameters contained in the storage.

In the event that the change of quotas for the applications is done in the proportion: 30%, 30%, 30%, the reconfiguration module 230 will either propose a correction variant such that the policy is satisfied and the security level is not worsened, or it will block such a change in the values of the parameters.

Figure 3A:
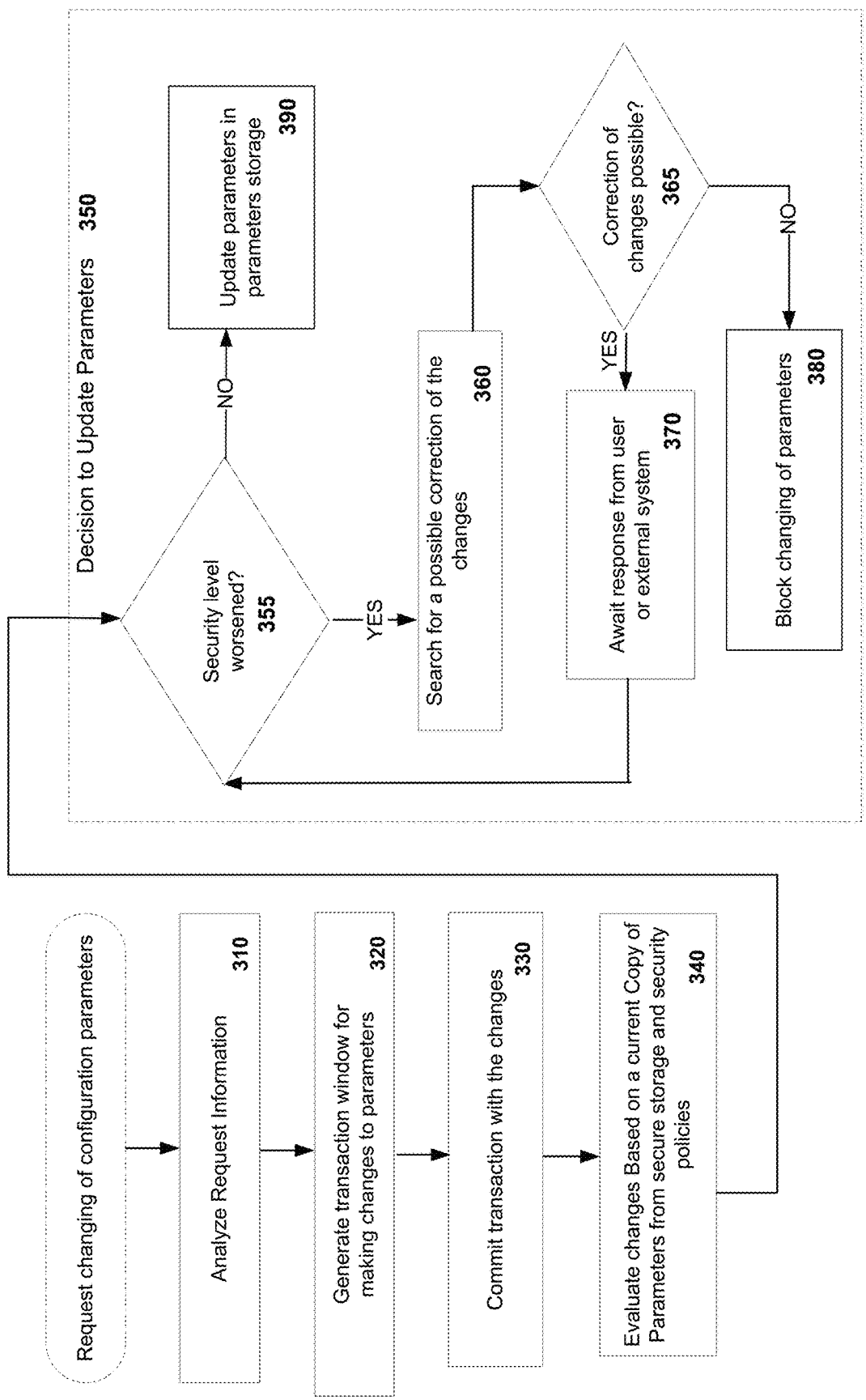
FIG. 3A illustrates a flowchart for a method of ensuring a given level of security upon changing the configuration of a system being monitored according to an exemplary aspect.

FIG. 3A illustrates a flowchart for a method of ensuring a given level of security upon changing the configuration of a system being monitored.

The method of ensuring a given level of security upon changing the configuration of a system being monitored upon receiving a request to change the parameters of the configuration in the parameters storage will carry out a number of steps, including at least: step 310, in which an analysis of the request to change the parameters is done; step 320, in which a transaction window is formed, taking into account current information about the parameters in the parameters storage, and making changes to the parameters; step 330, in which the transaction with the changes made is committed; step 340, in which an evaluation is done for the possibility of making the changes to the parameters contained in the parameters storage; step 350, in which a decision is made to update the parameters in the parameters storage.

In step 310, the Interaction Agent 110 receives a request containing information on a changing of parameters which are contained in turn in the storage 120 from at least one of the computer hardware and/or software 105. The request is formulated by a request initiator, i.e., either the hardware and/or software 105, such as an application, or the user through any communication with users, which is also one of the hardware and/or software 105. After this, the Interaction Agent 110 analyzes the information about the request, during which it determines at least one key presented. The key makes possible an exact identification of the parameter in the parameters storage 120 which needs to be changed. In one variant aspect, the key is an identifier of the parameter. Other information which the Interaction Agent 110 may discover from the received request is information on the identification of the hardware and/or software 105 or the user, information about new parameters, or information about the modification of at least one parameter or its value.

In step 320 the Interaction Agent 110 presents the transaction window to the initiator of the request for making changes to the parameters which are accessible to the corresponding initiator for modification. The modifying parameters may be either parameters of the monitored system 100 or parameters of an external system which influence the working ability of the monitored system 100. The transaction window presented may have the form of a dialogue window in which information about the changes is entered or that of an interface. The interface contains either current information about all the parameters contained in the parameters storage 120 or current information on only those parameters which can be modified in keeping with the identified key or identifier. For this, for example, the access level of the user to the parameters storage 120 is determined, where the access level indicates the kind of possible use of the parameters and of the parameters storage as a whole. The kinds of parameter used are at least the possibility of reading, the modification of at least one parameter, the location of the modification of at least changing the value of the parameter, changing the range of regulation of the parameter, adding a new parameter, and removal of a parameter.

It should be noted that, in order to place current information in the interface, the Interaction Agent 110 in step 320 carries out an interaction with the parameters storage 120 during which it forms a current copy of the state of the parameters contained in the parameters storage 120, making use of the key. Thus, the Interaction Agent 110 on the basis of the key and in consideration of the security label of the parameters determine which parameters may be modified. For example, the Interaction Agent 110 determines whether the key satisfies the attributes of the security label. After this, it creates a current copy of the corresponding parameters with the aid of the snapshot method. This method makes it possible to portray the static states of a set of parameters of the storage. Thus, the current copy represents a data set of preferential kind for analysis.

The exemplary aspect of the Interaction Agent 110 and the transaction window may also allow for an intermediate variant, when a dialogue window is formed for certain requests and a transaction interface with all the parameters for others, and a transaction interface with some of the parameters for yet others.

In step 330 the Interaction Agent 110 commits the transaction with the changes made to the parameters in response to the information on the parameters being changed as entered by the hardware and/or software 105 or obtained from the user via the corresponding hardware and/or software 105. Examples of such information are data on new values of the parameters, the removal of a parameter or the adding of a new parameter. After this, the transaction together with the current copy of data as to the state of all the parameters in the parameters storage 120 is sent to the reconfiguration module 130, specifically, to the analysis module 133. In the event that the current copy is not formed in step 320 or is formed but only for some of the parameters, then the current copy for all the parameters contained in the parameters storage 120 is formed in this step 330. For this, the Interaction Agent 110 performs actions similar to those described above, but taking into account the need to form a current copy of the state of all the parameters.

In step 340 the reconfiguration module 130 with the aid of the analysis module 133 performs an evaluation of the making of the corresponding changes to the parameters, the evaluation being done on the basis of the current copy received for the state of the parameters and with the aid of the corresponding security policies from the database of security policies 135. Thus, the reconfiguration module 130 analyzes the influence of the changes made on other parameters related to them in the parameters storage 120 and on breaches in the given security level of the monitored system 100. The analysis presupposes a checking of the consistency of the parameters being changed and the parameters related to them in terms of their conformity to the rules (conditions) contained in the security policies. After performing the analysis, the analysis module 133 presents the results of the analysis to the decision making module 137. The results contain information on a possible breach (lowering) of the security level and/or identified collisions, in the event of an inconsistency of the related parameters, and in a particular case also information on correction variants to eliminate the identified collisions.

In step 350 the decision making module 137 makes a decision on the updating of the parameters in the parameters storage 120. The decision is made on the basis of analysis of the results obtained. If no collisions have been found, the system understands that the security level has not been lowered. Otherwise, if at least one collision was found, then the security level will be lowered upon making the changes to the parameters. At the completion of the analysis, at least one of the following decisions is made: (1) make the changes to the parameters of the storage, since the security level will not be lowered; or (2) cancel the changes, since the security level will be lowered.

In a particular exemplary aspect of the method, the step 350 involves a series of steps which include an additional analysis of the identified collisions in order to determine a possible correction either for the parameters being changed or for related parameters from the parameters storage 120 so as to satisfy the given security level. Thus, in step 355 the results obtained in step 340 are analyzed. If no collisions are discovered, then as mentioned above a decision is made to make the changes, which is sent to step 390. Otherwise, if a collision has been identified, the decision making module 137 asks the analysis module 133 for possible correction variants which ensure at least no lowering of the security level. In step 360 the analysis module 133 sorts through the correction variants, which it will send to the decision making module 137. In step 365 the module 137 makes a decision on the correction for a possible making of changes to the parameters, so as to satisfy the given security level, while the correction might involve both the changes specified in the transaction window and parameters related to the parameters being changed. For this, the module 137 uses a list of conditions, in accordance with which it will determine the possibility of making the corrections from the variants received. After this, the module 137 either provides the corresponding variants to the user via the Interaction Agent 110 or independently (usually in the case of making changes by the hardware and/or software 105) makes a decision to correct or block the changes. Thus, in step 370 in the event that correction variants are present, the reconfiguration module 130 waits for and receives the response of the user as to the preferred variant, the information about which is sent to the Interaction Agent 110. In step 380 a blocking of the changes is done if correction variants are absent or if none of the variants corresponds to the list of conditions. Hence, if the Interaction Agent 110 has received information on a correction, the Agent will make the corresponding changes and in step 390 carry out a updating of the parameters in the parameters storage. An additional verification is also possible in step 355 after entering the selected correction variant.

Figure 3B:
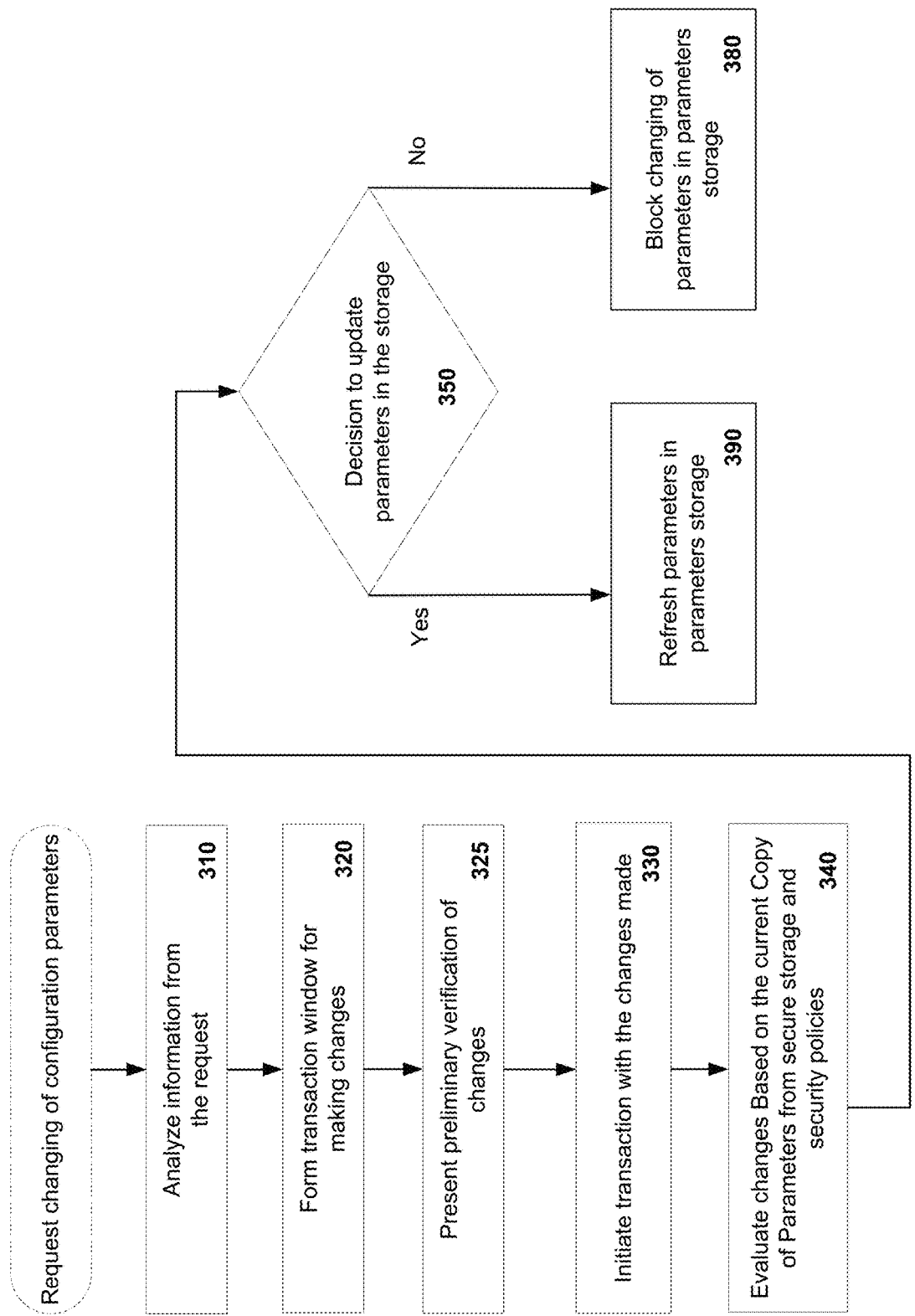
FIG. 3B illustrates another flowchart of a method of ensuring a given level of security upon changing the configuration of a system being monitored according to an exemplary aspect.

FIG. 3B illustrates yet another flowchart of an exemplary method of ensuring a given level of security upon changing the configuration of a system being monitored. It should be appreciated that the method of ensuring a given level of security upon changing the configuration of a system being monitored carries out the same steps 310, 320, 330, 340, 350, 380 and 390, as those described above with respect to FIG. 3A, when receiving a request to change the parameters of configuration in the parameters storage. However, in addition, in the exemplary aspect, in step 320 a transaction window is formed which contains only the parameters permitted for changing, and in step 325 a preliminary verification is done for the changes entered in the transaction window. The verification involves the following. The Interaction Agent 110 makes a request of the analysis module 133, the request being formulated in preferred form for analysis and containing at least the following data: the identifier of the application; the key presented by the application; and the changed values of the parameters. The analysis module 133 with the help of the security policies from the database of security policies 135 analyzes the changes received. During the analysis, it verifies the possibility of making such changes to the parameters from the standpoint of their correctness, i.e., does the new value lie in the permissible range, or does it exceed an established threshold value, or does it conform to the specified values? During the preliminary verification, rules or conditions from the security policies received might not be fully carried out, and in this case the policy conditions not carried out will be checked afterwards by the analysis module 133 in step 340.

Furthermore, in step 340 a verification is done only for consistency with other unchanged parameters in accordance with the conditions not fulfilled of the security policies used in step 325. After this, in step 350 a decision is made as to the updating of the parameters in the configuration of the parameters storage. On the basis of the decision made, the Interaction Agent 110 moves on to perform step 380, or step 390. Thus, in step 380 a blocking of the changes is done if there are no correction variants or none of the variants corresponds to the list of conditions. In step 390 the Interaction Agent 110 makes the corresponding changes if it has received information on a correction, and it performs a updating of the parameters in the parameters storage itself.

Figure 4:
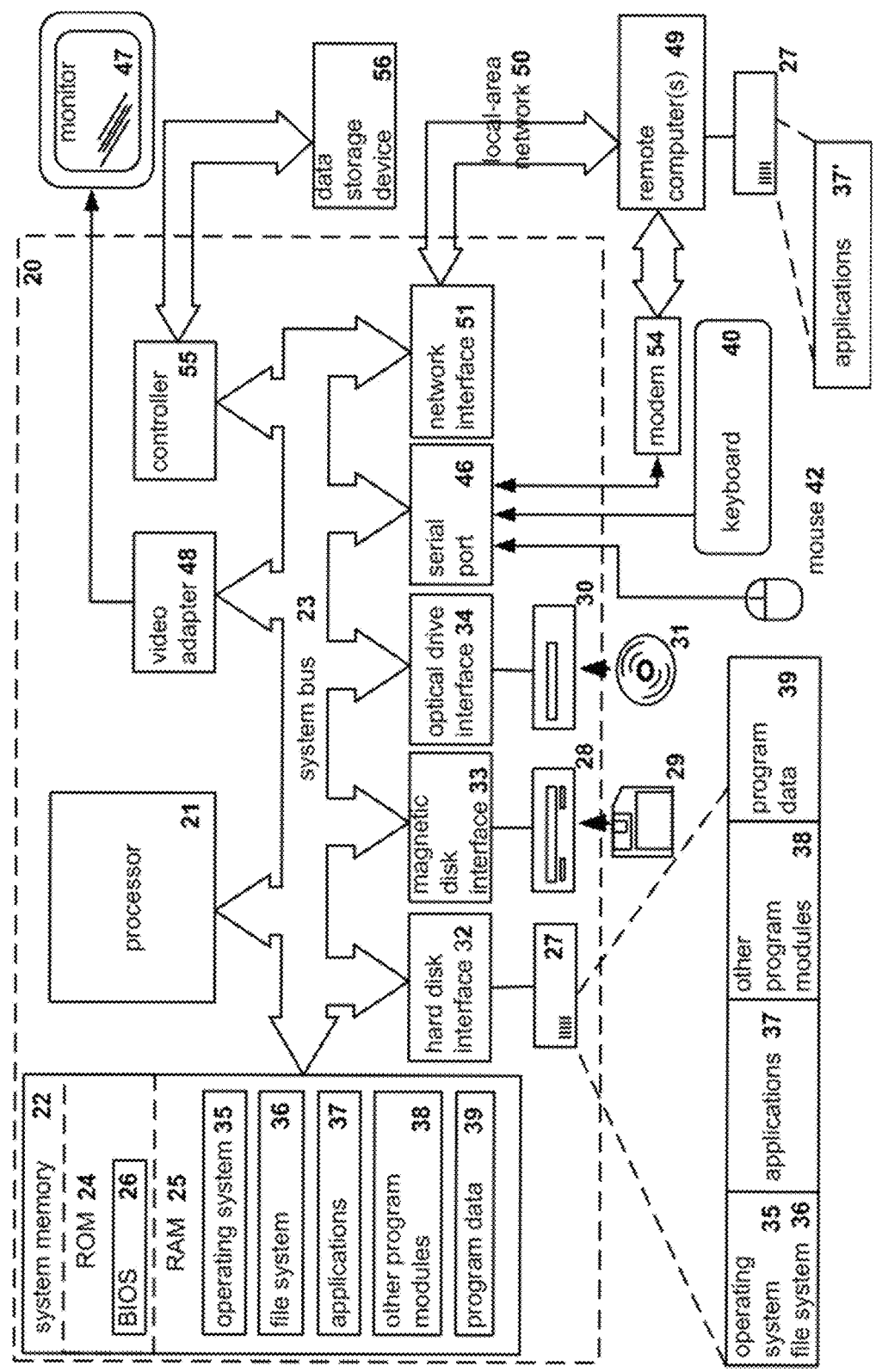
FIG. 4 illustrates an example of a general-purpose computer system (which may be a personal computer or a server) on which the disclosed systems and method can be implemented according to an example aspect.

FIG. 4 illustrates an example of a general-purpose computer system (which may be a personal computer or a server) on which the disclosed systems and method can be implemented according to an example aspect. As shown, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein

What is claimed:

1. A method for changing parameter values of a computer system without changing security properties, the method comprising:

receiving, by a processor, a request to change a system configuration of the computer system;

identifying, based on the request to change the system configuration, at least one parameter in a secure storage of parameters relating to system configurations of the computer system;

receiving, by the processor, instructions to change the identified at least one parameter from initiators;

initiating, by the processor, a transaction to change the identified at least one parameter based on the received instructions and forming a current copy of the state of the parameters in the secure storage;

19 verifying whether the change to the identified parameter is allowable and verifying consistency between the identified parameter and at least one unchanged parameter by evaluating whether the change conforms to rules of security policies by using the current copy of the state of the parameters at the time of making the change;

performing an analysis, by the processor, to determine whether the initiated transaction to change the identified at least one parameter will lower at least one security level of the computer system based on identified collisions between the identified parameter and the at least one unchanged parameter;

generating, by the processor, results of the analysis, wherein, when one or more collisions are identified, the results include information on the identified collisions and information on correction variants to eliminate the identified collisions; and executing, by the processor, the change of the identified at least one parameter related to the system configuration when no collisions between the identified parameter and the at least one unchanged parameter are identified.

2. The method according to claim 1, further comprising identifying, based on the request to change the system configuration, at least one key, such that the identifying of the at least one parameter in the secure storage of parameters is based on the identified key.

3. The method according to claim 1, further comprising displaying on a transaction window an interface configured to receive from an operator of the computer system the instructions to change the identified at least one parameter.

4. The method according to claim 3, wherein the instructions comprise at least one of a request to modify a value of the identified at least one parameter, a removal of the identified at least one parameter, or an adding of a new parameter related to the identified at least one parameter.

5. The method according to claim 1, further comprising:
determining, by the processor, a current state of the identified at least one parameter; and
analyzing the initiated transaction based on the determined current state of the identified at least one parameter and the at least one security level of the computer system to determine whether changes to the identified at least one parameter from the determined current state will conform to rules of the at least one security level of the computer system.

6. The method according to claim 5, further comprising canceling the change of the identified at least one parameter when the changes to the identified at least one parameter will not conform to the rules of the at least one security level of the computer system.

7. The method according to claim 1, further comprising:
identifying, by the processor, at least one variation to the instructions to change the identified at least one parameter when one or more collisions between the identified parameter and the at least one unchanged parameter are identified; and
determining, by the processor, whether the identified at least one variation to the instructions to change the identified at least one parameter will eliminate the one or more collisions if the identified at least one variation is executed by the processor to change the system configurations of the computer system.

8. The method according to claim 7, further comprising:
presenting, on a user interface, the identified at least one variation to the instructions to change the identified at least one parameter; and

20 executing, by the processor, the identified at least one variation to change the system configurations of the computer system upon receiving confirmation from a user instruction via the user interface.

9. The method according to claim 1, further comprising performing a preliminary analysis of the received instructions to change the identified at least one parameter before the initiating of the transaction to change the identified at least one parameter to verify consistency between the identified at least one parameter and at least one unchanged parameter in the in the secure storage of parameters that is related to the identified at least one parameter.

10. The method according to claim 9, wherein the initiating of the transaction to change the identified at least one parameter is performed upon verifying the consistency between the at least one unchanged parameter and the identified at least one parameter.

11. A system for changing parameter values of a computer system without changing security properties, the system comprising:
a secure storage of parameters relating to system configurations of the computer system; and
a hardware processor configured to:
receive a request to change a system configuration of the computer system from initiators;
identify, based on the request to change the system configuration, at least one parameter in the secure storage of parameters relating to the system configurations of the computer system and form a current copy of the state of the parameters in the secure storage;
receive instructions to change the identified at least one parameter;
initiate a transaction to change the identified at least one parameter based on the received instructions;
verify whether the change to the identified parameter is allowable and verify consistency between the identified parameter and at least one unchanged parameter by evaluating whether the change conforms to rules of security policies by using the current copy of the state of the parameters at the time of making the change;
perform an analysis to determine whether the initiated transaction to change the identified at least one parameter will lower at least one security level of the computer system based on identified collisions between the identified parameter and the at least one unchanged parameter;
generate results of the analysis, wherein, when one or more collisions are identified, the results include information on the identified collisions and information on correction variants to eliminate the identified collisions; and
execute the change of the identified at least one parameter related to the system configuration when no collisions between the identified parameter and the at least one unchanged parameter are identified.

12. The system according to claim 11, wherein the hardware processor is further configured to identify, based on the request to change the system configuration, at least one key, such that the identifying of the at least one parameter in the secure storage of parameters is based on the identified key.

13. The system according to claim 11, wherein the hardware processor is further configured to display on a transaction window an interface configured to receive from an operator of the computer system the instructions to change the identified at least one parameter.

14. The system according to claim 13, wherein the instructions comprise at least one of a request to modify a value of the identified at least one parameter, a removal of the identified at least one parameter, or an adding of a new parameter related to the identified at least one parameter.

15. The system according to claim 11, wherein the hardware processor is further configured to:
   determine a current state of the identified at least one parameter; and
   analyze the initiated transaction based on the determined current state of the identified at least one parameter and the at least one security level of the computer system to determine whether changes to the identified at least one parameter from the determined current state will conform to rules of the at least one security level of the computer system.

16. The system according to claim 15, wherein the hardware processor is further configured to cancel the change of the identified at least one parameter when the changes to the identified at least one parameter will not conform to the rules of the at least one security level of the computer system.

17. The system according to claim 11, wherein the hardware processor is further configured to:
   identify at least one variation to the instructions to change the identified at least one parameter when one or more collisions between the identified parameter and the at least one unchanged parameter are identified; and
   determine whether the identified at least one variation to the instructions to change the identified at least one parameter will eliminate the one or more collisions if the identified at least one variation is executed by the processor to change the system configurations of the computer system.

18. The system according to claim 17, wherein the hardware processor is further configured to:
   present, on a user interface, the identified at least one variation to the instructions to change the identified at least one parameter; and
   execute the identified at least one variation to change the system configurations of the computer system upon receiving confirmation from a user instruction via the user interface.

19. The system according to claim 11, wherein the hardware processor is further configured to perform a preliminary analysis of the received instructions to change the identified at least one parameter before the initiating of the transaction to change the identified at least one parameter to verify consistency between the identified at least one parameter and at least one unchanged parameter in the in the secure storage of parameters that is related to the identified at least one parameter.

20. The system according to claim 19, wherein the hardware processor is further configured to initiate of the transaction to change the identified at least one parameter is performed upon verifying the consistency between the at least one unchanged parameter and the identified at least one parameter.

21. A non-transitory computer readable medium comprising computer executable instructions for changing parameter values of a computer system without changing security properties, the instructions when executed:
   receiving a request to change a system configuration of the computer system;
   identifying, based on the request to change the system configuration, at least one parameter in a secure storage of parameters relating to system configurations of the computer system;
   receiving instructions to change the identified at least one parameter from initiators;
   initiating a transaction to change the identified at least one parameter based on the received instructions and forming a current copy of the state of the parameters in the secure storage;
   verifying whether the change to the identified parameter is allowable and verifying consistency between the identified parameter and at least one unchanged parameter by evaluating whether the change conforms to rules of security policies by using the current copy of the state of the parameters at the time of making the change;
   performing an analysis to determine whether the initiated transaction to change the identified at least one parameter will lower at least one security level of the computer system based on identified collisions between the identified parameter and the at least one unchanged parameter;
   generating, by the processor, results of the analysis, wherein, when one or more collisions are identified, the results include information on the identified collisions and information on correction variants to eliminate the identified collisions; and
   executing the change of the identified at least one parameter related to the system configuration when no collisions between the identified parameter and the at least one unchanged parameter are identified.

\* \* \* \* \*